United States Patent
Lim

(10) Patent No.: US 11,829,163 B2
(45) Date of Patent: Nov. 28, 2023

(54) UNMANNED AERIAL VEHICLE FOR FLEET OPERATION AND FLEET OPERATION SYSTEM

(71) Applicant: UVify Inc., Seattle, WA (US)

(72) Inventor: Hyon Lim, Seattle, WA (US)

(73) Assignee: UVify Inc., Seattle, WA (US)

( * ) Notice: Subject to any disclaimer, the term of this patent is extended or adjusted under 35 U.S.C. 154(b) by 291 days.

(21) Appl. No.: 16/727,165

(22) Filed: Dec. 26, 2019

(65) Prior Publication Data

US 2021/0200245 A1     Jul. 1, 2021

(51) Int. Cl.
*G05D 1/10* (2006.01)
*B64C 39/02* (2023.01)
*G08G 5/00* (2006.01)
*G08G 5/04* (2006.01)
*H04B 7/185* (2006.01)
*B64U 10/13* (2023.01)

(52) U.S. Cl.
CPC .......... *G05D 1/104* (2013.01); *B64C 39/024* (2013.01); *G08G 5/0034* (2013.01);
(Continued)

(58) Field of Classification Search
CPC .................. G05D 1/104; B64C 39/024; B64C 2201/027; B64C 2201/143;
(Continued)

(56) References Cited

U.S. PATENT DOCUMENTS

| 2014/0236388 A1 | 8/2014 | Wong et al. |
| 2015/0203213 A1* | 7/2015 | Levien ................ G08G 5/0008 |
| | | 701/486 |

(Continued)

FOREIGN PATENT DOCUMENTS

| EP | 3 272 652 A1 * | 1/2018 | ............. B64C 39/02 |
| EP | 3352041 A1 | 7/2018 | |
| WO | WO-2019093532 A1 * | 5/2019 | |

OTHER PUBLICATIONS

David Hyunchul Shim, Hierarchical Control System Synthesis for Rotorcraft-Based Unmanned Aerial Vehicles, 2000, American Institute of Aeronautics & Astronautics, 1-9 (Year: 2000).*

(Continued)

*Primary Examiner* — Elaine Gort
*Assistant Examiner* — Anthony M Gartrelle
(74) *Attorney, Agent, or Firm* — Dinsmore & Shohl LLP; Yongsok Choi, Esq.

(57) ABSTRACT

A fleet operation system for an unmanned aerial vehicle (UAV) is provided. The UAV according to an embodiment of the present disclosure includes a plurality of UAVs configured to fly in a fleet according to a determined task plan; and a ground control device for a fleet operation of the plurality of UAVs. The ground control device includes a first communication unit configured to receive flight information comprising a locations from the plurality of UAVs and transmit the task plan and satellite correction information to each of the plurality of UAVs; a second communication unit configured to transmit the satellite correction information to each of the plurality of UAVs; and a central processing unit configured to generate and transmit the task plan of each of the plurality of UAVs to each of the plurality of UAVs through the first communication unit.

20 Claims, 7 Drawing Sheets

(52) U.S. Cl.
CPC .......... *G08G 5/0069* (2013.01); *G08G 5/045* (2013.01); *H04B 7/18506* (2013.01); *B64U 10/13* (2023.01); *B64U 2201/102* (2023.01); *B64U 2201/20* (2023.01)

(58) Field of Classification Search
CPC .......... B64C 2201/146; G08G 5/0034; G08G 5/0069; G08G 5/045; H04B 7/18506
See application file for complete search history.

(56) References Cited

U.S. PATENT DOCUMENTS

| | | |
|---|---|---|
| 2016/0293019 A1* | 10/2016 | Kim .................. G08G 5/0069 |
| 2016/0307448 A1 | 10/2016 | Salnikov et al. |
| 2017/0069214 A1* | 3/2017 | Dupray ............... G08G 5/0069 |
| 2017/0146990 A1* | 5/2017 | Wang .................. G05D 1/00 |
| 2018/0096609 A1* | 4/2018 | de la Cruz .......... G08G 5/0034 |

OTHER PUBLICATIONS

Ruben Morales-Ferre, A Survey on Coping With Intentional Interference in Satellite Navigation for Manned and Unmanned Aircraft, 2020, IEEE Communications Surveys & Tutorials, vol. 22, No. 1, 249-291 (Year: 2020).*

Taro Suzuki, Robust UAV Position and Attitude Estimation using Multiple GNSS Receivers for Laser-based 3D Mapping, 2019, IEEE/RSJ International Conference on Intelligent Robots and Systems (IROS), 4402-4408 (Year: 2019).*

* cited by examiner

UNMANNED AERIAL VEHICLE FOR FLEET OPERATION AND FLEET OPERATION SYSTEM

BACKGROUND

1. Field

The present disclosure relates to an unmanned aerial vehicle (UAV) for a fleet operation and a fleet operation system, and more particularly, to an UAV capable of improving stability and reliability in an UAV fleet operation by using a communication channel having different radio wave characteristics and bandwidths together and a fleet operation system for the UAV.

2. Description of the Related Art

Recently, various fields utilizing an unmanned aerial vehicle (UAV) have emerged. Among other fields, there is a great interest in the UAV capable of a fleet operation that accomplishes tasks quickly and efficiently using a plurality of UAVs. The fleet operation of the UAV is more technically difficult than the control of one UAV because not only control of each UAV but also additional control such as movement and collision control between UAVs in a fleet are required. However, it is advantageous that it is possible to improve a task performing speed because multiple UAVs perform tasks that one UAV can perform, and each UAV serves as one pixel by tasks that one UAV cannot perform, for example, the cooperative control of the plurality of UAVs and produces a display in the air.

The fleet operation system for a plurality of UAVs according to the related art has the following problems in communication, navigation, assignment of tasks and signal synchronization.

In terms of communication, there is a problem that communication interference occurs according to locations between the plurality of UAVs, and communication signals do not reach according to distances between a ground control system and the UAVs. The plurality of UAVs is far from the ground control system while performing tasks and moves densely in different directions. In this case, various distance and angle changes between the UAVs and the ground control system may occur. Because the communication system according to the related art performs communication through one communication method or one frequency channel, communication is interrupted, which makes it difficult for the communication system in a stable fleet operation.

In addition, in terms of navigation, it is impossible to perform a precise task because the error of location information of the actual UAV and location information on the global navigation satellite system (GNSS) is large. Because the GNSS commonly used by UAVs has usually a location error of 3 m to 5 m, the risk of mutual collision between UAVs while performing fleet operation tasks increases. In particular, displaying in the air using a plurality of UAVs requires a high location accuracy of the UAV, but there is a problem that it is difficult to properly perform a task due to such a location error.

In terms of route and task assignment, a lot of labor is required to assign routes and tasks for performing an initial task. In general, UAVs are assigned tasks waiting on the ground prior to takeoff. According to the related art, tasks are assigned in the order of UAVs having a specific ID. For this purpose, because UAVs are arranged in the order of IDs with a constant formation each time, waste of manpower is large.

In terms of signal synchronization, because a plurality of UAVs is used to perform tasks, there is a high probability that an UAV does not receive a synchronization signal. According to the related art, the ground control system transmits one synchronization signal to the plurality of UAVs, and each UAV receives the synchronization signal to synchronize the time. However, in this process, a packet may be delayed or lost.

SUMMARY

The present disclosure includes an UAV for a fleet operation and a fleet operation system to prevent the loss of control of the UAV due to an interruption of communication by multiplexing communication between a ground control system and the UAV.

The present disclosure also includes an UAV for a fleet operation and a fleet operation system capable of preventing mutual collisions of a plurality of UAVs, moving more precisely, and performing tasks in which a ground control system generates and transmits a satellite correction signal in real time to the plurality of UAVs while performing tasks.

The present disclosure also includes an UAV for a fleet operation and a fleet operation system capable of smoothly assigning tasks regardless of the initial arrangement formation of the UAV.

The present disclosure also includes an UAV for a fleet operation and a fleet operation system in which an operator obtains the control authority of the UAV and stably transfers a control signal to the UAV, in order to cope with emergency situations occurring while performing tasks.

The problems of the present disclosure are not limited to the above-mentioned matters, and other technical problems that are not mentioned above will be clearly understood by those skilled in the art from the following description.

Additional aspects will be set forth in part in the description which follows and, in part, will be apparent from the description, or may be learned by practice of the presented embodiments.

According to an embodiment of the present disclosure, a fleet operation system for an unmanned aerial vehicle (UAV) includes a plurality of UAVs configured to fly in a fleet according to a determined task plan; and a ground control device for a fleet operation of the plurality of UAVs; wherein the ground control device includes a first communication unit configured to receive flight information including a locations from the plurality of UAVs and transmit the task plan and satellite correction information to each of the plurality of UAVs; a second communication unit configured to transmit the satellite correction information to each of the plurality of UAVs; and a central processing unit configured to generate and transmit the task plan of each of the plurality of UAVs to each of the plurality of UAVs through the first communication unit.

The task plan may include a flight route of each of the plurality of UAVs over time such that the plurality of UAVs performs an aerial display.

The first communication unit may be further configured to perform bidirectional communication with the UAV, and the second communication unit may be further configured to perform unidirectional communication with the UAV.

The ground control device may further include an emergency control unit configured to generate an emergency control signal for the UAV, the emergency control signal may be transmitted to each of the plurality of UAVs through the first communication unit and the second communication unit, and each of the plurality of UAVs may be further configured to prioritize the emergency control signal received from the first communication unit.

The ground control device may include: a manual control unit configured to allow an operator to manually control the UAV; and a third communication unit configured to transmit an emergency operation signal generated by the manual control unit to each of the plurality of UAVs.

The emergency operation signal may be generated when any one of the plurality of UAVs is disconnected from the first communication unit and the second communication unit or generated by an operation of the operator.

The first communication unit may include a sub communication unit having different radio wave characteristics so as to perform multiple communication channels with the plurality of UAVs.

The sub communication unit may include one of a non-directional low gain antenna and a directional high gain antenna.

The first communication unit may communicate with the plurality of UAVs at a frequency of 2 GHz to 6 GHz.

The second communication unit may communicate with the plurality of UAVs at a frequency lower than that of the first communication unit.

The central processing unit may be further configured to receive location information of each of the plurality of UAVs through the first communication unit to recognize a formation of the plurality of UAVs, and based on the recognized formation, transmit the task plan performed by the UAV at a location corresponding to the formation to each of the plurality of UAVs.

The central processing unit may be further configured to recognize the plurality of UAVs located in a centerline of the recognized formation, assign the task plan at locations corresponding to locations of the recognized plurality of UAVs, recognize the plurality of UAVs located at rows and columns adjacent to the plurality of UAVs to which tasks are sequentially assigned, and assign the task plan.

The central processing unit may be further configured to repeatedly transmit a synchronization signal to each of the plurality of UAVs through the first communication unit or the second communication unit before a task start time of the task plan.

According to another embodiment of the present disclosure, an unmanned aerial vehicle (UAV) for a fleet operation includes a processor configured to receive a task plan including a flight route according to the fleet operation to control a flight; a main communication unit configured to transmit flight information to a ground control device, receive the task plan from the ground control device, and transmit the task plan to the processor; and a first sub communication unit configured to receive satellite correction information from the ground control device and transmit the satellite correction information to the processor, and the processor is configured to correct a location of the UAV using the satellite correction information.

The UAV may continue the flight using the satellite correction information received from the first sub communication unit when a failure occurs in the main communication unit.

The UAV may further include: a second sub communication unit configured to receive an emergency operation signal from the ground control device and transmit the emergency operation signal to the processor, and the UAV manually may operate by an operator when the failure occurs in the main communication unit and the first sub communication unit.

The flight information may include one or more of a three-axis angular velocity, a three-axis acceleration, satellite position information and motor drive information.

The flight route may include space information over time, and the UAV may further include: a light emitting unit configured to emit a color determined according to the time of the flight route.

The main communication unit may be further configured to traverse based on a reception sensitivity among multiple communication channels of the ground control device and automatically select a channel having the best reception sensitivity.

The main communication unit may be further configured to perform bidirectional communication with the ground control device, and the first sub communication unit and the second sub communication unit may be further configured to perform only unidirectional communication capable of reception from the ground control device.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
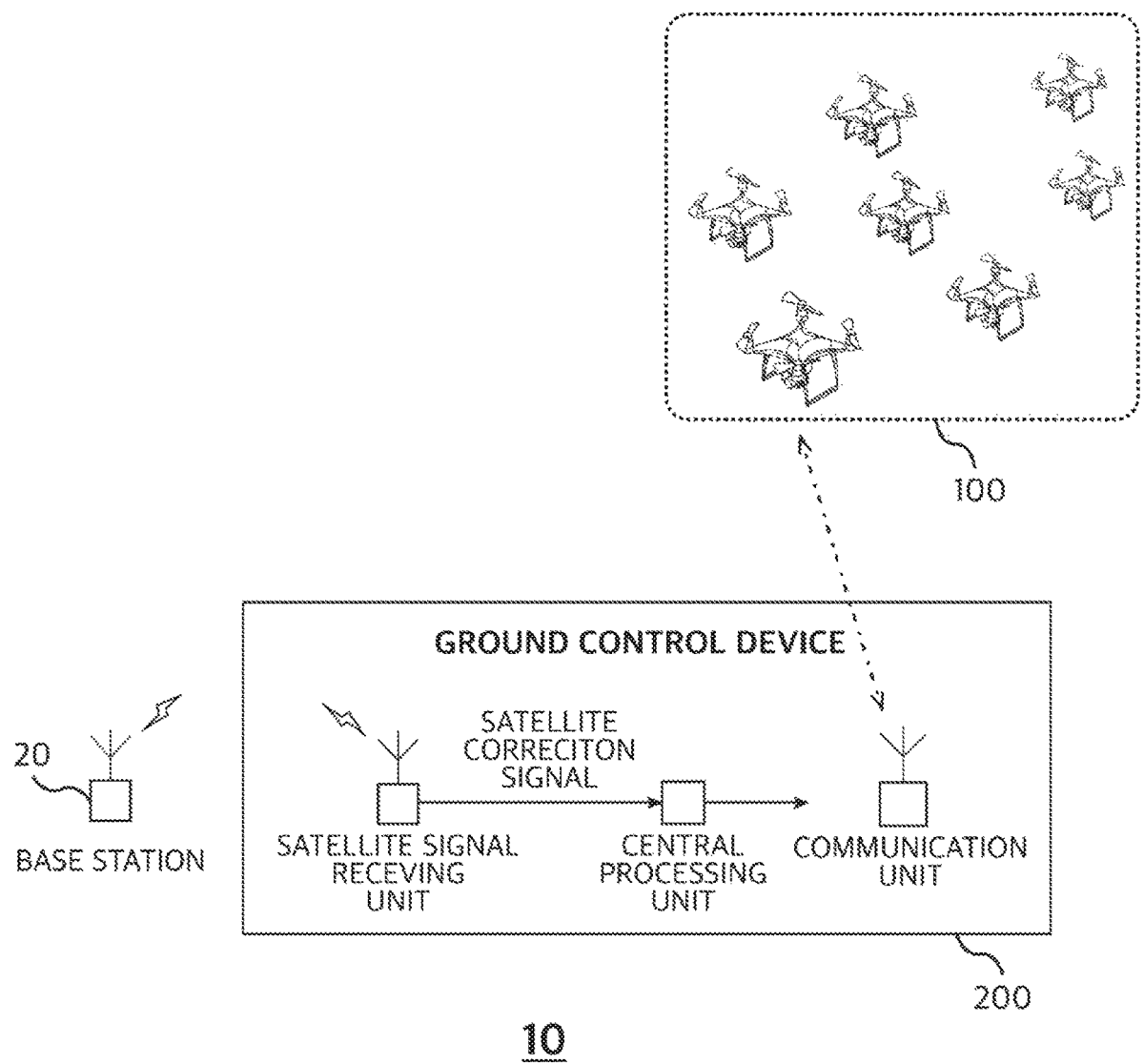
FIG. 1 is a diagram showing a schematic view of a fleet operation system for an unmanned aerial vehicle (UAV) according to an embodiment of the present disclosure.

Hereinafter, the present disclosure will be described in detail by explaining embodiments of the disclosure with reference to the attached drawings. The present disclosure e may, however, be embodied in many different forms and should not be construed as being limited to the embodiments of the disclosure set forth herein. In the drawings, parts not related to the disclosure are not illustrated for clarity of explanation.

The terms used in the present description are merely used to describe particular embodiments of the disclosure, and are not intended to limit the scope of the present disclosure. The expression of singularity in the present specification may include the expression of plurality unless clearly specified otherwise in context.

In the present specification, it may be understood that the terms such as "including", "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

In addition, the components shown in the embodiments of the present disclosure are independently shown to represent different characteristic functions, and do not mean that each component includes separate hardware or one software component unit. That is, each component is described by listing each component for convenience of description, and at least two of the components may be combined into one component, or one component may be divided into a plurality of components to perform a function. The integrated and separated embodiments of each of these components are also included within the scope of the present disclosure without departing from the spirit of the disclosure.

The following embodiments are provided so that this disclosure will be thorough and complete, and will fully convey the concept of the disclosure to those skilled in the art. In the drawings, the thicknesses of layers and regions are exaggerated for clarity.

The present disclosure will now be described more fully with reference to the accompanying drawings, in which exemplary embodiments of the disclosure are shown.

Figure 2:
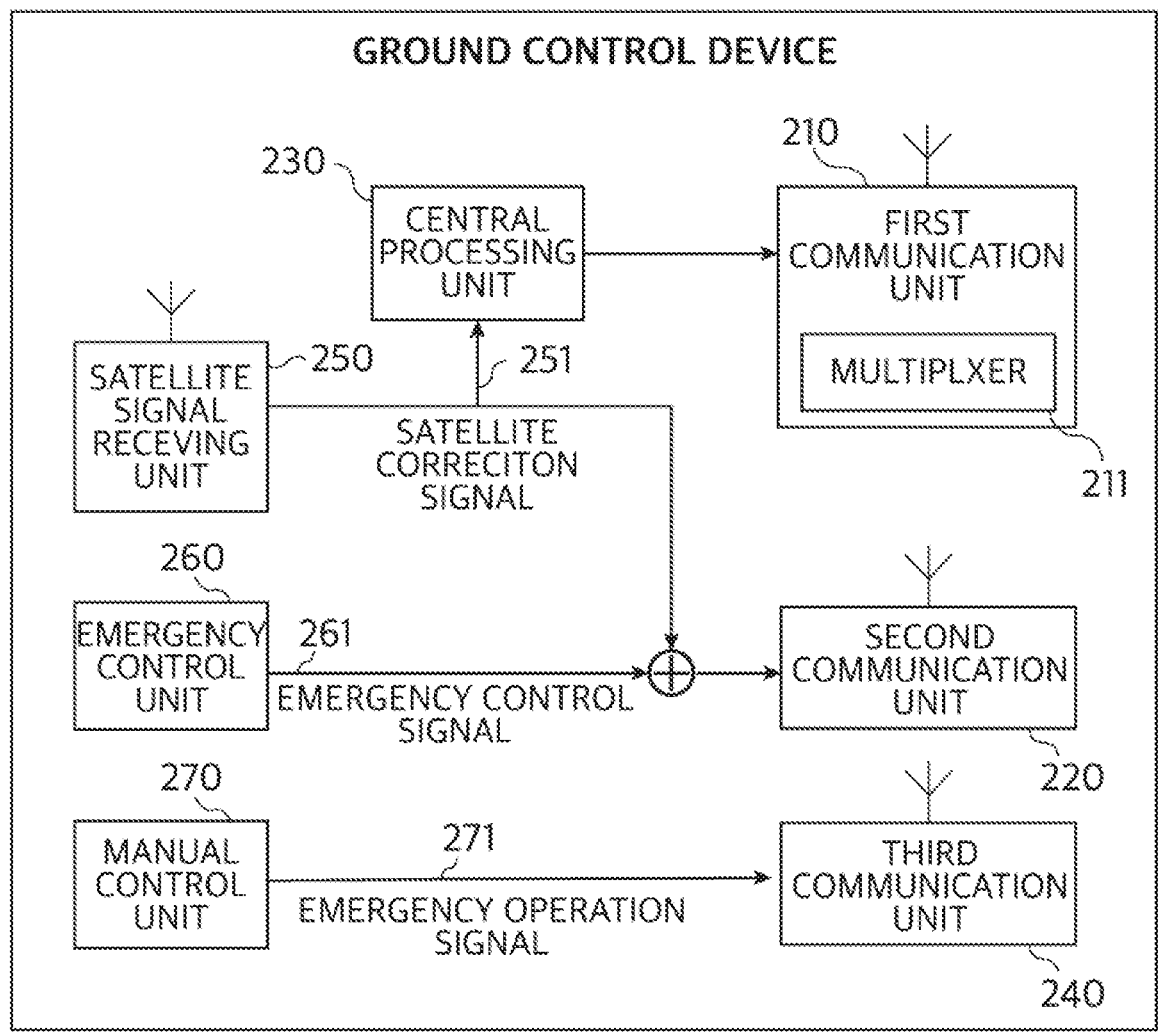
FIG. 2 is a block diagram of a ground control device of the fleet operation system according to an embodiment of the present disclosure.
Figure 3A:
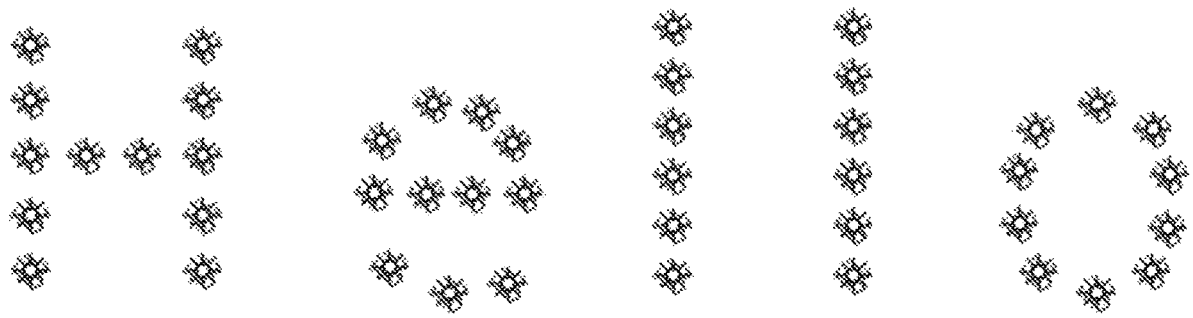
FIG. 3A is a diagram showing an example of task plan performed by a plurality of UAVs according to an embodiment of the present disclosure.
Figure 3B:
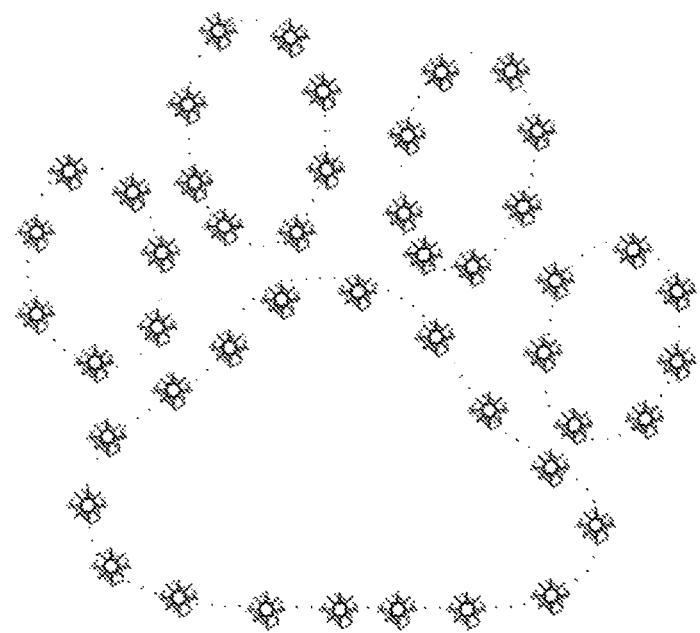
FIG. 3B is a diagram showing an example of task plan performed by a plurality of UAVs according to an embodiment of the present disclosure.

FIG. 1 is a diagram showing a schematic view of a fleet operation system 10 for an unmanned aerial vehicle (UAV) according to an embodiment of the present disclosure. FIG. 2 is a block diagram of a ground control device 200 of the fleet operation system 10 according to an embodiment of the present disclosure. FIGS. 3A and 3B are diagrams showing examples of task plan performed by a plurality of UAVs 100 according to an embodiment of the present disclosure.

Referring to FIGS. 1 and 2, the fleet operation system 10 may include the plurality of UAVs 100 and the ground control device 200.

The plurality of UAVs 100 may be UAVs in which each UAV has an independent movement and flies according to the given task plan. The UAV 100 may fly in a fleet in view of the task plan.

Here, the UAV 100 may be a vehicle manufactured to perform a designated task while flying by radio wave guidance without a pilot.

The ground control device 200 may be a device for operating the plurality of UAVs 100 in the fleet. The ground control device 200 may include a first communication unit 210, a second communication unit 220, and a central processing unit 230.

The first communication unit 210 may perform bidirectional communication with each of the plurality of UAVs 100. More specifically, the first communication unit 210 may receive flight information from the plurality of UAVs 100 and transmit the task plan and a satellite correction signal 251 to each of the UAVs 100.

Here, the flight information may include one or more of three-axis angular velocity information, three-axis acceleration information of the UAV 100, current satellite location information of the UAVs 100, and real-time motor driving information of the UAVs 100. The current satellite location information may be location information of the UAVs 100 using satellite navigation that calculates the location, altitude value, and velocity of a moving object around the earth by using radio waves transmitted to a satellite such as a global navigation satellite system (GNSS).

The task plan may include a route and a performing operation in which each of the plurality of UAVs 100 flies over time. For example, as shown in FIGS. 3A and 3B, the plurality of UAVs 100 may perform synchronized three-dimensional (3D) movements, thereby expressing a predetermined shape of the aerial formation of the plurality of UAVs 100 at a specific time. In addition, light emitting units of the plurality of UAVs 100 may emit different colors according to the specific time. In this case, each of the UAVs 100 may operate as one pixel such that all of the plurality of UAVs 100 may operate as one aerial display to output a screen in the air.

A location measurement using the satellite navigation may cause an error in an actual location due to the modulation of a satellite signal caused by an ionosphere delay. A base station 20 may calculate an error for each satellite that varies from time to time based on a location accurately determined in advance. Therefore, the base station 20 may generate and transmit error information by correcting the error for each satellite. The error information may be generated using, for example, a real-time kinematic (RTK) method.

A satellite signal receiving unit 250 may receive the error information and generate the satellite correction signal 251 based on the error information. The UAV 100 may receive the satellite correction signal 251 from the ground control device 200 and synthesize the satellite correction signal 251 with the satellite location information obtained from the UAV 100 to determine the exact location information of the current point.

The second communication unit 220 may perform unidirectional broadcasting communication with respect to each of the plurality of UAVs 100. More specifically, the second communication unit 220 may transmit the satellite correction signal 251 to each of the UAVs 100. In this case, the second communication unit 220 may transmit the identification numbers of the plurality of UAVs 100 together with the satellite correction signal 251.

In this case, when broadcasting a signal, the second communication unit 220 may transmit information corresponding to its own previously determined ID together, and the UAV 100 may selectively receive and process the signal corresponding to the ID. In a situation where there is no obstacle, the UAV 100 may preferentially process a signal transmitted from the first communication unit 210 among signals received from the first communication unit 210 and the second communication unit 220.

The satellite correction signal 251 may be repeatedly transmitted by the ground control device 200 using the first communication unit 210 and the second communication unit 220. The UAV 100 indispensably needs the satellite correction signal 251 to successfully perform the task plan. The satellite correction signal 251 is transmitted to the central processing unit 230. The central processing unit 230 transmits the satellite correction signal 251 to the UAV 100 through the first communication unit 210. However, a situation in which the central processing unit 230 does not operate due to an error may occur. In this case, the first communication unit 210 may not transmit the satellite correction signal 251 to the UAV 100. Accordingly, because the UAV 100 does not receive the satellite correction signal 251, the UAV 100 does not fly properly according to the task plan, and thus the UAV 100 may fail the given task plan. To prevent this, the ground control device 200 may transmit the satellite correction signal 251 to the UAV 100 by using the second communication unit 220 redundantly. Accordingly, even when the UAV 100 does not receive the satellite correction signal 251 from the first communication unit 210, the UAV 100 may stably receive the satellite correction signal 251 transmitted by the second communication unit 220 and stably perform tasks. In a situation where there is no obstacle, the UAV 100 may preferentially process the satellite correction signal 251 received from the first communication unit 210 with respect to the satellite correction signal 251 received from the first communication unit 210 and the second communication unit 220.

The ground control device 200 may further include an emergency control unit 260 that generates an emergency control signal 261 for the UAV 100.

The emergency control unit 260 may generate the emergency control signal 261 when a first emergency situation occurs. Here, the first emergency situation may be a situation in which communication is interrupted between the UAV 100 and the first communication unit 210 and the UAV 100 does not receive a control signal transmitted by the first communication unit 210. In addition, the emergency control unit 260 may generate the emergency control signal 261 by an operation of an operator who observes the performing of the task plan of the plurality of UAVs 100. The emergency control signal 261 is a control signal generated by the emergency control unit 260 automatically or by the operation of the operator to control the UAV 100 in the first emergency situation and may include an avoidance start signal, a task stop signal, etc. of the UAV 100.

When the emergency control unit 260 generates the emergency control signal 261, the first communication unit 210 and the second communication unit 220 may broadcast the emergency control signal 261 together with the satellite correction signal 251 to the UAV 100. The UAV 100 may receive the emergency control signal 261 transmitted through the first communication unit 210 and the second communication unit 220 but preferentially process the emergency control signal 261 transmitted by the first communication unit 210.

The ground control device 200 may further include a manual control unit 270 and a third communication unit 240. In a second emergency situation, the manual control unit 270 may generate an emergency operation signal 271 for manually controlling the UAV 100 by the operation of the operator. The second emergency situation may be a situation in which the UVA 100 can no longer perform the task plan because the UAV 100 is disconnected from the first communication unit 210 and the second communication unit 220 or a failure occurs in the fleet operation system 10 or the UAV 100. The emergency operation signal 271 may be a signal such as a task interruption command or an emergency landing command to prevent an accident that may occur due to the second emergency situation.

The third communication unit 240 may perform unidirectional broadcasting communication with respect to each of the plurality of UAVs 100. More specifically, the third communication unit 240 may transmit the emergency operation signal 271 generated by the manual control unit 270 to each of the plurality of UAVs 100.

In this case, the third communication unit 240 may transmit the identification numbers of the plurality of UAVs 100 together with the emergency operation signal 271. Therefore, the plurality of UAVs 100 may selectively receive only the emergency operation signal 271 corresponding to its identification number.

In addition, when broadcasting a signal, the third communication unit 240 may transmit information corresponding to its own predetermined ID together, and the UAV 100 may selectively receive and process the signal corresponding to the ID. The UAV 100 may preferentially process a signal transmitted by the first communication unit 210 among signals. In a situation where there is no obstacle, the UAV 100 may preferentially process a signal transmitted by the first communication unit 210 among signals received by the first communication unit 210, the second communication unit 220, and the third communication unit 240.

The central processing unit 230 may generate the task plan of each of the plurality of UAVs 100, and transmit the generated task plan to each of the plurality of UAVs 100 through the first communication unit 210.

Figure 4:
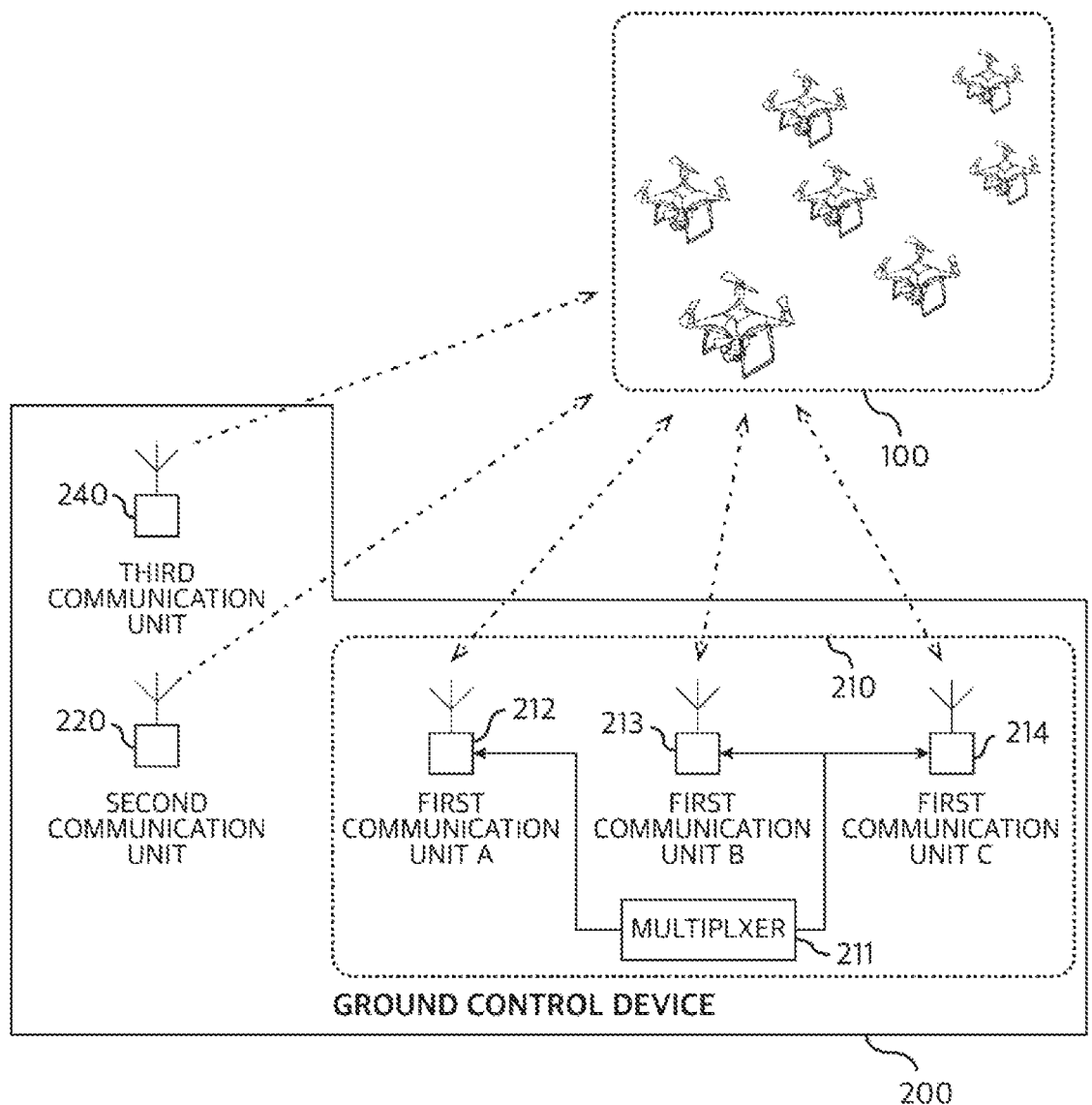
FIG. 4 is a diagram schematically illustrating a communication structure of a fleet operation system according to an embodiment of the present disclosure.
Figure 5:
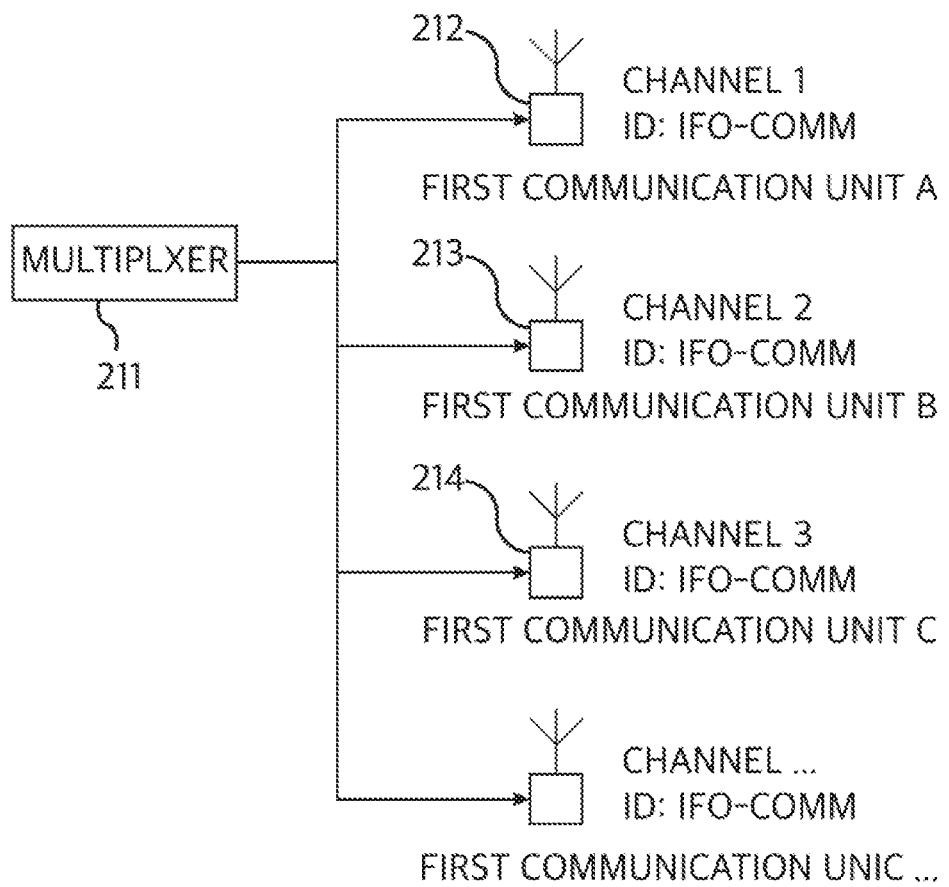
FIG. 5 is a block diagram of a first communication unit according to an embodiment of the present disclosure.

FIG. 4 is a diagram schematically illustrating a communication structure of a fleet operation system according to an embodiment of the present disclosure. FIG. 5 is a block diagram of the first communication unit 210 according to an embodiment of the present disclosure.

Referring to FIGS. 4 and 5, the ground control device 200 may communicate with the UAV 100 using radio waves having different characteristics for the communication stability with the UAV 100. To this end, the first communication unit 210 may communicate with the UAV 100 at a high bandwidth high frequency, the second communication unit 220 at a low bandwidth low frequency, and the third communication unit 240 at a low bandwidth high frequency. More specifically, the first communication unit 210 may communicate with the UAV 100 at a frequency of 2 GHz to 6 GHz. For example, the first communication unit 210 may communicate with the UAV 100 at a frequency of 2.4 GHz and 5.8 GHz.

Because the first communication unit 210, the second communication unit 220, and the third communication unit 240 communicate by radio waves having different characteristics, even when a requirement disrupting communication between the ground control device 200 and the UAV 100 arises, a possibility that communication of all the communication units is interrupted may be greatly reduced.

In addition, because the first communication unit 210 is a main communication means and performs bidirectional communication, the first communication unit 210 may communicate with the UAV 100 at a wide bandwidth, and because the second communication unit 220 and the third communication unit 240 perform unidirectional broadcasting communication that unilaterally transmits a signal to the UAV 100, the second communication unit 220 and the third communication unit 240 may communicate with the UAV 100 at a relatively narrower bandwidth than the first communication unit 210.

Communication between the first communication unit 210 and the UAV 100 may be performed in multiple communication channels for communication stability. To this end, the first communication unit 210 may include sub communication units 212, 213 and 214 having different radio wave characteristics so as to perform multiple communication channels with the plurality of UAVs 100. Also, the first communication unit 210 may include a multiplexer 211 for data transmission and reception between the sub communication units 212, 213, and 214 and the central processing unit 230.

Here, the first communication unit a 212 may use a non-directional low gain antenna, the first communication unit b 213 may use a directional high gain antenna, and the first communication unit c 214 may use a non-directional low gain antenna.

At this time, the multiplexer 211 may transmit task plan and the satellite correction signal 251 received by the central processing unit 230 of FIG. 2 to the first communication unit a 212, the first communication unit b 213, and the first communication unit c 214. The first communication unit a 212, the first communication unit b 213, and the first communication unit c 214 may have the same ID and transmit radio waves according to respective antenna characteristics to generate the multiple communication channels. The ID may be an identification code with respect to a signal transmitted by the first communication unit 210, such as a Service Set Identifier (SSID).

The number of the multiple channels is not determined but may be determined according to a bandwidth and an allocated frequency range. For example, when 800 MHz from 5 GHz to 5.8 GHz is allocated, and when 40 MHz is allocated to one channel, a total of 20 channels may operate. According to the 20 channels, the first communication unit 210 may have 20 sub communication units, and it is possible to set a radio wave according to a field situation by setting antennas of the sub communication units differently. However, even in this case, because frequencies of the communication channels are adjacent to each other, the fundamental communication characteristics do not change significantly. Accordingly, the second communication unit 220 and the third communication unit 240 may be effective complementary channels.

The UAV 100 may selectively communicate with the first communication unit 210 in a channel having the best reception sensitivity among the multiple communication channels according to the reception sensitivity of the UAV 100. More specifically, the UAV 100 may traverse a plurality of communication channels having the same ID and select a channel having the best reception sensitivity among the plurality of communication channels. The central processing unit 230 may store the communication channel selected by the UAV 100 and transmit the task plan and satellite correction information to the UAV 100 using the communication channel.

The fleet operation system may perform triple complementary communication using different radio wave characteristics and perform multiplexing with respect to one transmission reception communication, thereby extremely increasing communication stability between the ground control device 200 and the plurality of UAVs 100.

Figure 6:
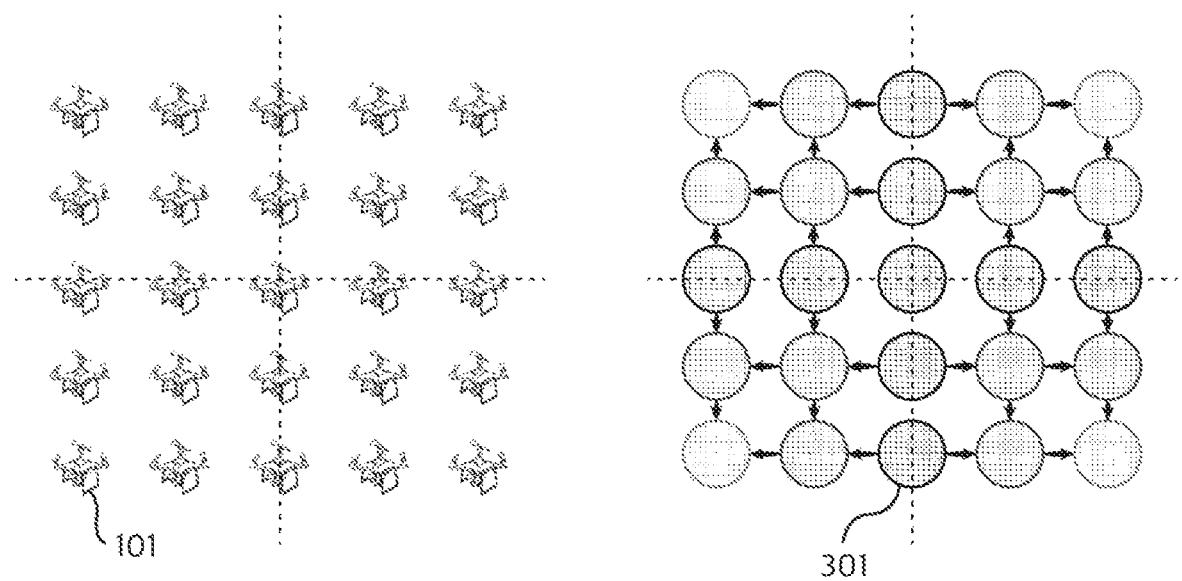
FIG. 6 is a diagram showing the arrangement of UAVs for assigning task plan according to an embodiment of the present disclosure.

FIG. 6 is a diagram showing the arrangement of the UAVs 100 for assigning task plan according to an embodiment of the present disclosure.

Referring to FIGS. 2 and 6, in general, the UAVs 100 may be arranged with a certain formation before taking off for the task plan. This is because when the UAVs 100 are irregularly arranged, the possibility of collision during takeoff is high, and flying in an unexpected direction to avoid collision may cause confusion. For example, a plurality of UAVs that perform an aerial display may initially be arranged in a matrix formation in the form of M×N. Each UAV 100 has a unique number and needs to be set to perform a unique task.

The central processing unit 230 may receive the location information of each of the UAVs 100 through the first communication unit 210 to recognize the formation of a plurality of UAVs, and based on the recognized formation, transmit the task plan performed by the UAV 100 at a location corresponding to the formation to each of the UAVs 100.

At this time, the central processing unit 230 may recognize the UAVs 100 located in the centerline of the recognized formation, assign the task plan at locations corresponding to the locations of the recognized UAVs 100, recognize the UAVs 100 located at rows and columns adjacent to the UAVs 100 to which tasks are sequentially assigned, and assign the task plan.

Specifically, the central processing unit 230 may virtually set a plurality of task arrangement frames 301 to assign the task plan to the UAVs 100 and arrange the plurality of task arrangement frames 301 at a predetermined formation. The UAV 100 may be arranged such that one UAV 100 corresponds to one task arrangement frame 301. The central processing unit 230 may assign the task plan assigned to the task arrangement frame 301 to the UAV 100 located at the task arrangement frame 301. Here, the central processing unit 230 may identify the UAV 100 located at the center by using the actual location information of the UAV 100. Thereafter, the central processing unit 230 may identify the task arrangement frame 301 located at the center among the plurality of task arrangement frames 301 and assign the task plan with respect to a corresponding region to the UAV 100 located at the center of the actual arrangement. As shown in FIG. 6, the central processing unit 230 may sequentially match the task plan corresponding to the UAVs 100 located at the next row and the next column with respect to the centerline.

According to the related art, a task plan corresponding to each of the UAVs 100 is assigned one by one using the same identification number as the serial number of the UAV 100 such that the task plan corresponds to the identification number, but in this case, the initial arrangement of the UAVs 100 is difficult, which requires a lot of manpower and time. According to the present disclosure, the task plan is previously assigned to the task arrangement frame 301 and is assigned to the UAV 100 located at a location corresponding to the task arrangement frame 301, thereby reducing time and manpower.

Figure 7:
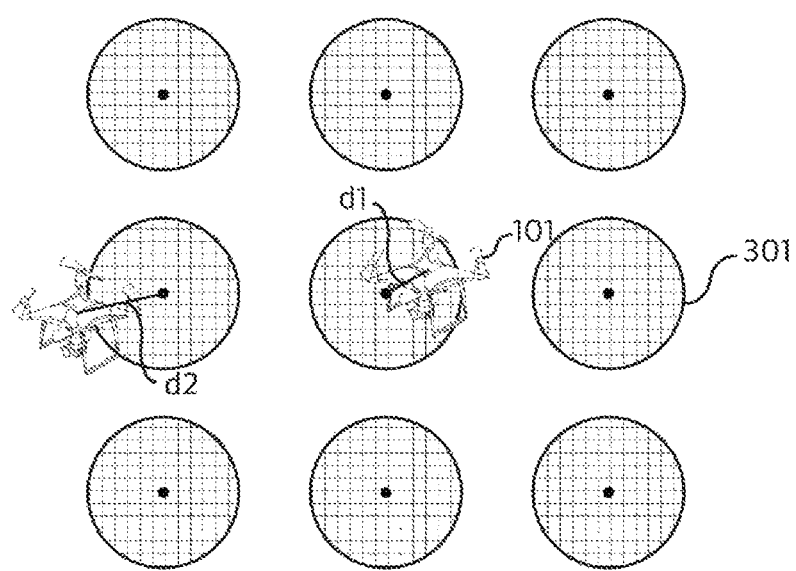
FIG. 7 is a diagram illustrating the assignment of UAVs to task arrangement frames according to an embodiment of the present disclosure.

FIG. 7 is a diagram illustrating the assignment of the UAVs 100 to the task arrangement frames 301 according to an embodiment of the present disclosure.

Referring to FIGS. 2 and 7, the central processing unit 230 may recognize the location of each of the UAVs 100, measure a distance between the location of each of the UAVs 100 and each of the task arrangement frame 301, and match the UAVs 100 and the task arrangement frames 301 such that the sum of distances of the UAVs 100 and the task arrangement frames 301 is minimum.

More specifically, the central processing unit 230 may calculate distances d1 and d2 between the center location of each of the task arrangement frames 301 and the location of each of the UAVs 100 and match the UAV 100 closest to one task arrangement frame 301 with the corresponding task arrangement frame 301. Through this, even if the UAV 100 is not exactly located within the task arrangement frame 301, because it is possible to mach each of the task arrangement frames 301 and the UAV 100, the arrangement time of the UAVs 100 and the installation time of a fleet operation system may be reduced.

Figure 8:
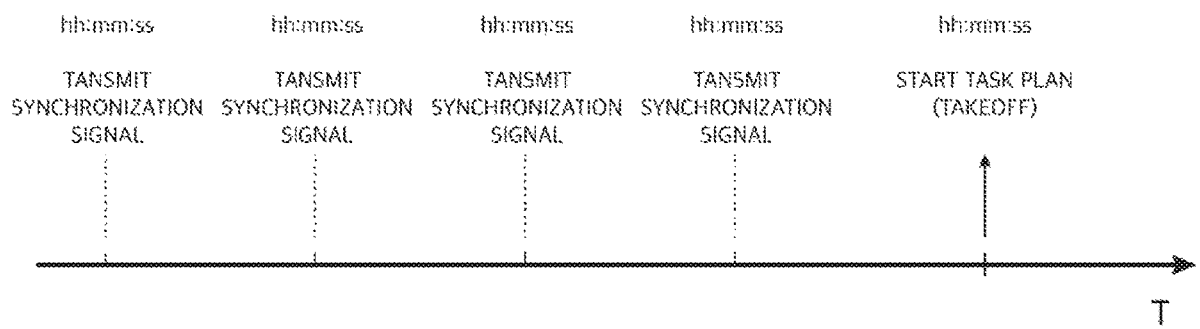
FIG. 8 is a diagram showing a synchronization signal transmission time of a UAV according to an embodiment of the present disclosure.

FIG. 8 is a diagram showing a synchronization signal transmission time of the UAV 100 according to an embodiment of the present disclosure.

Referring to FIGS. 2 and 8, the central processing unit 230 may repeatedly transmit a synchronization signal to each of the UAVs 100 through the first communication unit 210 before the task start time of a task plan. For example, the central processing unit 230 may transmit the synchronization signal until all of the plurality of UAVs 100 receives the synchronization signal.

When the plurality of UAVs 100 are connected to the central processing unit 230 through the communication channel of the first communication unit 210, the central processing unit 230 may transmit the synchronization signal through the corresponding communication channel before the plurality of UAVs 100 start the task plan. However, when the synchronization signal is transmitted only once before the task plan starts, some of the UAVs 100 may not receive the synchronization signal due to the disconnection of the communication channel or the error. In order to prevent such a case, the central processing unit 230 may repeatedly transmit the synchronization signal several times before the task start time such that all the UAVs 100 receives the synchronization signal. At this time, even if the reception time of the synchronization signal is different, it is possible to transmit time information about the start of the task plan such that there is no difference in the time when a synchronized task starts.

A general system using a plurality of UAVs uses a protocol such as network time protocol (NTP) to synchronize the time of the UAVs and a ground control device, whereas the present disclosure uses a navigation unit provided in the UAV 100 to synchronize the time in the unit of nano second, thereby solving the time synchronization problem that has occurred in the related art.

Hereinafter, the UAV 100 is included in the above-described fleet operation system, communicates with the ground control device of the fleet operation system, and performs the task plan. Thus, the UAV 100 may include means for performing the technical features described in the ground control device.

In addition, terms and names appearing in the description of the UAV 100 are the same as the technical features described in the fleet operation system and thus will be omitted.

Figure 9:
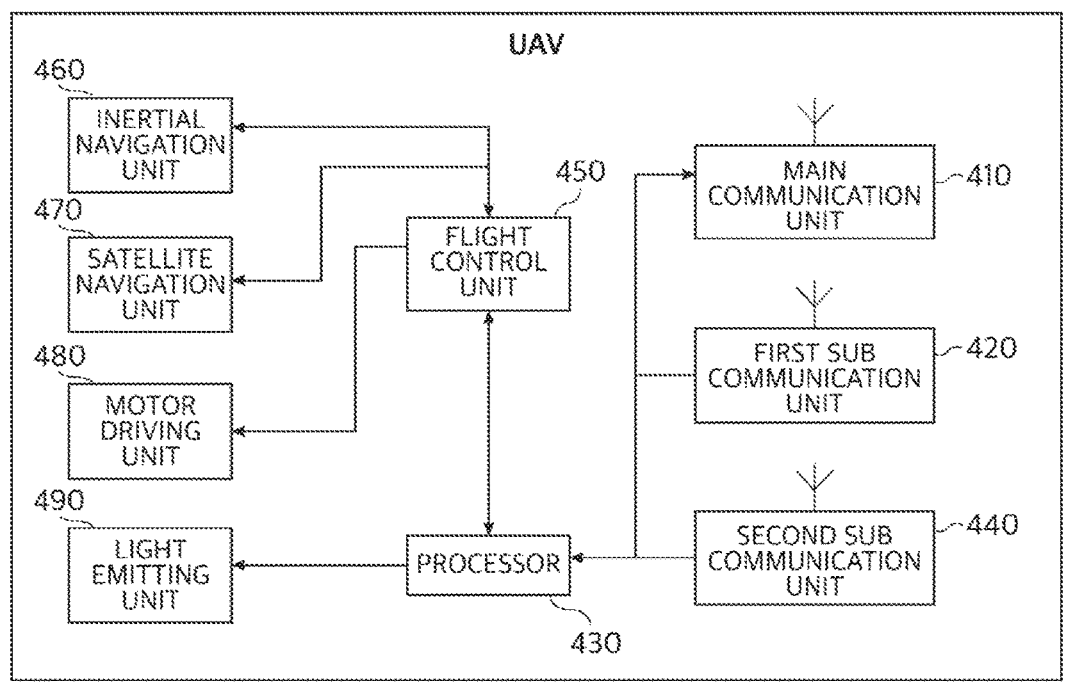
FIG. 9 is a block diagram of a UAV according to an embodiment of the present disclosure.

FIG. 9 is a block diagram of a UAV 400 according to an embodiment of the present disclosure.

Referring to FIG. 9, the UAV 400 according to an embodiment of the present disclosure may communicate with a ground control device of a fleet operation system and may be controlled by the ground control device.

The UAV 400 for a fleet operation may include a main communication unit 410, a first sub communication unit 420, and a processor 430.

The processor 430 may receive a task plan including a flight route according to the fleet operation of the plurality of UAVs 400 to control the flight of the UAV 400.

The main communication unit 410 may transmit flight information to the ground control device, receive the task plan from the ground control device, and transmit the task plan to the processor 430.

The main communication unit 410 may traverse based on the reception sensitivity among multiple communication channels of the ground control device and select a channel having the best reception sensitivity to automatically connect to the channel.

The first sub communication unit 420 may receive satellite correction information from the ground control device and transmit the satellite correction information to the processor 430.

Here, the processor 430 may correct the location of the UAV 400 using the satellite correction information.

In addition, when connection between the main communication unit 410 and the ground control device is lost, the UAV 400 may continue the flight by using the satellite correction information received from the first sub communication unit 420.

The UAV 400 may further include a second sub communication unit 440 that receives an emergency operation signal from the ground control device and transmits the emergency operation signal to the processor 430. The emergency operation signal may be transmitted from the ground control device when the main communication unit 410 and the first sub communication unit 420 are disconnected from the ground control device or may be a manual operation signal by an operator.

The main communication unit 410, the first sub communication unit 420, and the second sub communication unit 440 of the UAV 400 respectively communicate with the first communication unit 210, the second communication unit 220, and the third communication unit 240 of the ground control device 200 of FIG. 2. In more detail, the main communication unit 410 of the UAV 400 may transmit and receive a high bandwidth high frequency to correspond to the radio wave characteristics of the first communication unit 210 and perform bidirectional communication, and the first sub communication unit 420 of the UAV 400 may receive a low bandwidth low frequency broadcasted to correspond to the radio wave characteristics of the second communication unit 220 of the ground control device 200 and perform unidirectional communication. The second sub communication unit 440 of the UAV 400 may receive a low bandwidth high frequency broadcasted to correspond to the radio wave characteristic of the third communication unit 240 of the ground control device 200 and perform unidirectional communication.

In a situation where there is no communication failure, in the UAV 400, the main communication unit 410, the first sub communication unit 420, and the second sub communication unit 440 may receive signals, and in this case, the processor 430 may preferentially process the received signals in the order of the main communication unit 410, the first sub communication unit 420, and the second sub communication unit 440.

The UAV 400 may include a flight control unit 450, an inertial navigation unit 460, a satellite navigation unit 470, and a motor driving unit 480.

The flight control unit 450 may receive or transmit location information from the inertial navigation unit 460 and the satellite navigation unit 470 under the control of the processor 430 and control the motor driving unit 480 according to the flight route.

The UAV 400 may further include a light emitting unit 490 that emits color. The UAV 400 flies along the flight route. Because the flight route includes space information over time, the UAV 400 may emit the light emitting unit 490 according to a location or time determined in the flight route. For example, the light emitting unit 490 may be configured as a combination of a plurality of LEDs that emits various colors.

For example, the UAV 400 may fly in letters or shapes illustrated in FIGS. 3A and 3B and a plurality of UAVs may emit the light emitting unit 490 at a spatial location and time determined according to the flight route.

The UAV for a fleet operation and the fleet operation system according to an embodiment of the present disclosure may prevent the loss of control of the UAV by preventing an interruption of communication by multiplexing communication between a ground control system and the UAV.

In addition, the UAV for the fleet operation and the fleet operation system may prevent mutual collisions of a plurality of UAVs and moving more precisely and performing tasks in which a ground control system generates and transmits a satellite correction signal in real time to the plurality of UAVs while performing tasks.

In addition, the UAV for the fleet operation and the fleet operation system may perform multiplex communication to provide a stable satellite correction signal.

In addition, the UAV for the fleet operation and the fleet operation system may smoothly assign tasks regardless of the initial arrangement formation of UAVs.

In addition, an operator may obtain the control authority of the UAV and stably transfer a control signal to the UAV in order to cope with emergency situations occurring while the UAV performs tasks.

In addition, the UAV for the fleet operation and the fleet operation system may prevent a synchronization error due to a communication delay by repeatedly transmitting the synchronization signal.

Effects of the present disclosure are not limited to the above-mentioned contents, and other effects not mentioned will be clearly understood by those skilled in the art from the following description.

The various embodiments of the present disclosure may be implemented by hardware, middleware, microcode, software, and/or any combination thereof. For example, the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, control parts, micro-control parts, microprocessors, or other electronic units designed to perform the functions described above, and/or a combination thereof.

The hardware, software, firmware and so on are implemented in the same device or individual devices to support the various operations and functions described in the present disclosure. Additionally, the units, modules, components as described by the term 'parts' of the present disclosure may be individually formed as interoperable logic devices. The description on the different characteristics of the modules, units and the like is intended to emphasize the different functional embodiments of the present disclosure, and it does not mean that they should be operated by the individual hardware or software components. On the contrary, the functions related to one or more modules or units are performed by the individual hardware or software components or may be integrated by the common or individual hardware or software components.

Although the present disclosure has been described with reference to the embodiment shown in the drawings, this is merely an example. Persons skilled in the relevant art can appreciate that many modifications and variations are possible in light of the above teachings. It is therefore intended that the scope of the disclosure be limited not by this detailed description, but rather by the claims appended hereto.

What is claimed is:

1. A fleet operation system for an unmanned aerial vehicle (UAV) comprising:
    a plurality of UAVs configured to fly in a fleet according to a determined task plan; and
    a ground control device configured to perform a fleet operation of the plurality of UAVs from a ground,
    wherein the ground control device comprises:
    a first communication unit configured to receive flight information comprising satellite locations of the plurality of UAVs from the plurality of UAVs and transmit the task plan and a satellite correction signal to each of the plurality of UAVs;
    a second communication unit configured to transmit the satellite correction signal redundant with the satellite correction signal transmitted by the first communication unit to each of the plurality of UAVs, the second communication unit being a separate unit from the first communication unit; and
    a central processing unit configured to generate and transmit the task plan of each of the plurality of UAVs to each of the plurality of UAVs through the first communication unit,
    wherein each of the plurality of UAVs synthesizes the satellite correction signal with the satellite location of corresponding UAV to determine an exact location of corresponding UAV.

2. The fleet operation system of claim 1, wherein the task plan comprises a flight route of each of the plurality of UAVs over time such that the plurality of UAVs perform an aerial display.

3. The fleet operation system of claim 2, wherein the first communication unit is further configured to perform bidirectional communication with the plurality of UAVs, and
    wherein the second communication unit is further configured to perform unidirectional communication with the plurality of UAVs.

4. The fleet operation system of claim 1, wherein the ground control device further comprises an emergency control unit configured to generate an emergency control signal for the plurality of UAVs,
    wherein the emergency control signal is transmitted to each of the plurality of UAVs through the first communication unit and the second communication unit, and
    wherein each of the plurality of UAVs is further configured to prioritize the emergency control signal received from the first communication unit.

5. The fleet operation system of claim 1, wherein the ground control device comprises:
    a manual control unit configured to allow an operator to manually control the plurality of UAVs; and
    a third communication unit configured to transmit an emergency operation signal generated by the manual control unit to each of the plurality of UAVs.

6. The fleet operation system of claim 5, wherein the emergency operation signal is generated when any one of the plurality of UAVs is disconnected from the first communication unit and the second communication unit, or is generated by an operation of the operator.

7. The fleet operation system of claim 1, wherein the first communication unit comprises a plurality of sub communication units having different radio wave characteristics so as to perform multiple communication channels with the plurality of UAVs.

8. The fleet operation system of claim 7, wherein each of the sub communication units comprises one of a non-directional low gain antenna and a directional high gain antenna.

9. The fleet operation system of claim 1, wherein the first communication unit communicates with the plurality of UAVs at a frequency of 2 GHz to 6 GHz.

10. The fleet operation system of claim 1, wherein the second communication unit communicates with the plurality of UAVs at a frequency lower than that of the first communication unit.

11. The fleet operation system of claim 1, wherein the central processing unit is further configured to receive location information of each of the plurality of UAVs through the first communication unit to recognize a formation of the plurality of UAVs and transmit, based on the recognized formation, the task plan performed by the plurality of UAVs at a location corresponding to the formation to each of the plurality of UAVs.

12. The fleet operation system of claim 11, wherein the central processing unit is further configured to recognize the plurality of UAVs located in a centerline of the recognized formation, assign the task plan at locations corresponding to locations of the plurality of recognized UAVs, recognize the plurality of UAVs located at rows and columns adjacent to the plurality of UAVs to which tasks are sequentially assigned, and assign the task plan.

13. The fleet operation system of claim 1, wherein the central processing unit is further configured to repeatedly transmit a synchronization signal to each of the plurality of UAVs through the first communication unit or the second communication unit before a task start time of the task plan.

14. An unmanned aerial vehicle (UAV) for a fleet operation comprising:
a processor configured to receive a task plan comprising a flight route according to the fleet operation to control a flight;
a main communication unit configured to transmit flight information including a satellite location of the UAV to a ground control device, receive the task plan from a first communication unit of the ground control device, and transmit the task plan to the processor; and
a first sub communication unit configured to receive a satellite correction signal for correcting the satellite location of the UAV from a second communication unit of the ground control device and transmit the satellite correction signal to the processor, the first sub communication unit being a separate unit from the main communication unit,
wherein the processor is configured to correct the satellite location of the UAV using the satellite correction signal received from the second communication unit of the ground control device in response to connection between the main communication unit and the first communication unit being lost, and
wherein the processor is configured to synthesize the satellite correction signal with the satellite location of the UAV to determine an exact location of the UAV.

15. The UAV of claim 14, wherein the UAV continues the flight using the satellite correction signal received from the first sub communication unit when a failure occurs in the main communication unit.

16. The UAV of claim 14, further comprising:
a second sub communication unit configured to receive an emergency operation signal from the ground control device and transmit the emergency operation signal to the processor,
wherein the UAV is manually operated by an operator when a failure occurs in the main communication unit and the first sub communication unit.

17. The UAV of claim 16, wherein the flight information comprises one or more of a three-axis angular velocity, a three-axis acceleration, satellite position information and motor drive information.

18. The UAV of claim 14, wherein the flight route comprises space information over time,
the UAV further comprising a light emitting unit configured to emit a color determined according to the time of the flight route.

19. The UAV of claim 14, wherein the main communication unit is further configured to traverse based on a reception sensitivity among multiple communication channels of the ground control device and automatically select a channel having the best reception sensitivity.

20. The UAV of claim 16, wherein the main communication unit is further configured to perform bidirectional communication with the ground control device, and
wherein the first sub communication unit and the second sub communication unit are further configured to perform unidirectional communication capable of only reception from the ground control device.

* * * * *